Oct. 18, 1966   R. D. THOMPSON   3,280,358
COLOR CATHODE RAY TUBE WITH RADIATION-EMITTING INDEX STRIPES
Filed July 9, 1963
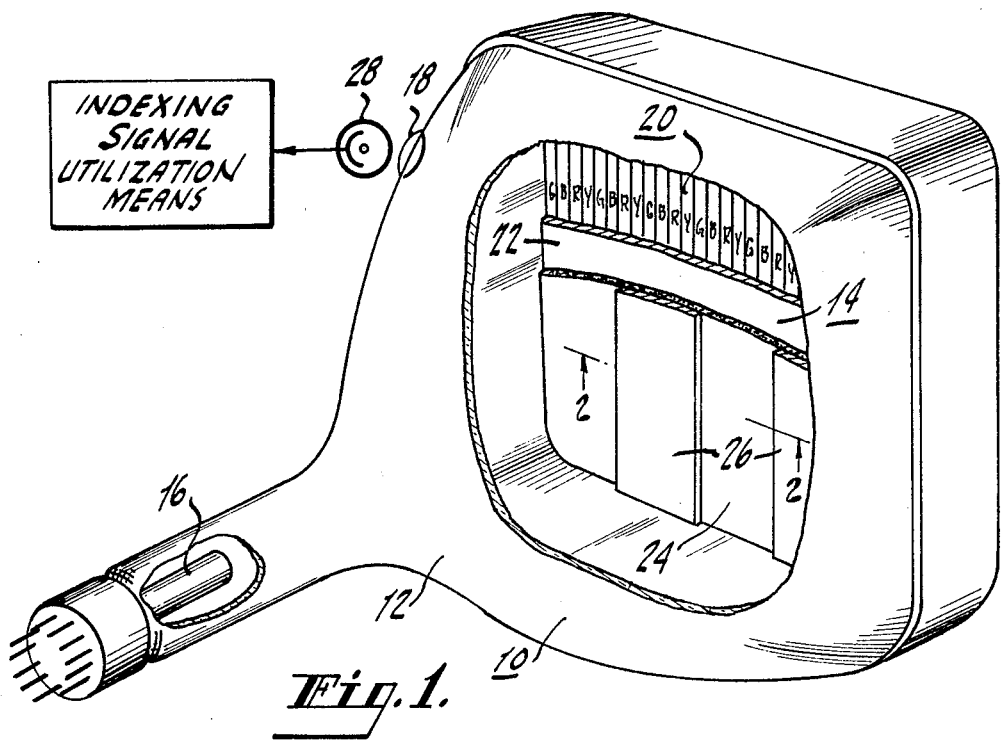
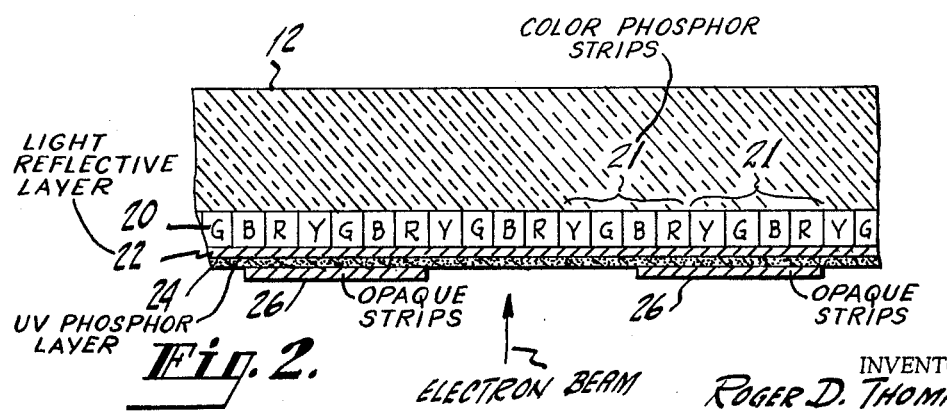
INVENTOR.
ROGER D. THOMPSON
BY
William A. Zalesak
Attorney

United States Patent Office 3,280,358
Patented Oct. 18, 1966

3,280,358
COLOR CATHODE RAY TUBE WITH RADIATION-EMITTING INDEX STRIPES
Roger D. Thompson, Princeton, N.J., assignor to Radio Corporation of America, a corporation of Delaware
Filed July 9, 1963, Ser. No. 293,611
11 Claims. (Cl. 313—92)

This invention relates to image reproducing devices for producing color images and particularly to cathode ray tubes having a luminescent screen which includes means for generating indexing signals for the purpose of synchronizing the scan and color modulation of the electron beam with each other. Such tubes are sometimes known as feedback or sensing tubes.

One such tube as disclosed by the prior art includes a mosaic luminescent screen comprising an array of similar color phosphor groups, each of which includes a plurality of different color-emitting phosphor strips disposed parallel to each other and perpendicular to the direction of the beam scan. A plurality of spaced-apart phosphor strips which emit ultraviolet (UV) light when bombarded by electrons are disposed on the back of, and parallel to, the color phosphor strips. The tube envelope is provided with a UV transmitting window rearwardly of the luminescent screen, whereby a UV sensitive photo-tube outside the cathode ray tube can pick up UV indexing signals which are generated when the electron beam scans across the spaced apart UV phosphor strips.

In a sensing tube as described above, in order to provide a sufficient level of indexing signal output, the UV phosphor strips should be thick enough to absorb an appreciable amount of electron beam energy (e.g. 5-10%). Because this beam absorption is intermittent as the beam scans across the spaced UV phosphor strips, the remaining beam energy which excites the color phosphor strips varies between a high and a low level. This variable excitation of the color phosphor strips causes an objectionable brightness variation across the screen of the cathode ray tube. This condition may be referred to as intermittent shadowing of the mosaic color screen. Such a condition becomes most objectionable in tubes wherein the number of UV phosphor indexing strips is less than the number of groups of color phosphor strips i.e., in a fractional frequency system of indexing.

It is an object of this invention to provide an image reproducing device of the sensing variety which includes a new and improved luminescent screen structure.

It is also an object of this invention to provide a luminescent screen for a sensing type color cathode ray tube which screen includes new and improved means for generating indexing signals.

According to this invention, an image reproducing device of the sensing variety includes a luminescent screen having a mosaic of recurring groups of different color emitting phosphor deposits. A layer of material which emits radiations when excited by electrons (preferably a UV-emitting phosphor) overlies the color phosphor mosaic. Disposed adjacent to the layer of radiation-emitting material is an array of mutually spaced deposits which are opaque to the radiations thereof.

In the drawing,
FIGURE 1 is a perspective view with parts broken away and interior greatly enlarged of a sensing-type color cathode ray tube embodying the invention; and
FIGURE 2 is an enlarged section of a portion of the tube of FIGURE 1 taken along the line 2—2 thereof.

As shown in the figures, a cathode ray tube 10 comprises an envelope 12 having a luminescent screen 14 disposed on an internal surface thereof. An electron gun 16 is disposed in the envelope 12 and adapted to project an electron beam onto the screen 14. A window 18 is provided in the envelope 12 rearwardly of the luminescent screen 14 for a purpose hereinafter described.

The luminescent screen 14 includes a mosaic 20 of different color emitting phosphor strips. The color strips may for example comprise successive strips of red-emitting, blue-emitting, green-emitting, and yellow-emitting phosphors designated in the drawings as R, B, G, and Y, respectively. The mosaic 20 is made up of a plurality of recurring groups 21, each of which includes one each of the R, B, G, and Y strips.

The specific character of the color phosphor groups 21, for example, the width of the color strips, the color emission of the color strips, the number of color strips for each group, and the color order of arrangement of the strips within each group, may be chosen in accordance with known practices. For example, a mosaic of red, blue, and green phosphor strips may be used.

Preferably, a light reflective layer 22 is superimposed on the back of the mosaic 20, i.e. on the side facing toward the electron gun 16. If included, the light reflective layer 22 may, for example, comprise a layer of evaporated aluminum which is disposed on the color mosaic 20 in accordance with known practices.

Superimposed upon the back of the light reflective layer 22 in overlying relationship with the mosaic 20, is a solid, continuous layer 24 of phosphor. The solid phosphor layer 24 is preferably one which emits principally ultraviolet luminescence. For example, cesium-lithium activated calcium-magnesium-silicate phosphor known as P16 may be used. Other UV emitting phosphors, or a material which emits visible light or other radiations when bombarded by electrons may alternatively be used for the solid layer 24.

Superimposed on the back of the solid phosphor layer 24 is an array of spaced-apart strip deposits 26 which are substantially opaque to the luminescent emission of the solid phosphor layer 24. The opaque strips 26 are disposed in a systematic relationship with, and parallel to, the color phosphor strips R, B, G, and Y of the mosaic 20. For example, one opaque strip 26 may be provided for every three groups 21 of the color phosphor strips. Each opaque strip 26 may be disposed in overlying relationship with an R, B, G, Y, R, and part of a B phosphor strip. The spacing between adjacent opaque strips 26 may be equal to the width of each opaque strip. However, other width relationship, spacing relationship, and periodicity relationship of the opaque strips 26 to the color phosphor strips R, B, G, and Y of the mosaic 20 may be provided.

The opaque strips 26 may be provided from a material which will either absorb or reflect the luminescent emission of the solid phosphor layer 24 which is generated therebeneath. For example, an absorbing material such as powdered carbon or a reflective material such as evaporated aluminum is satisfactory as a material for the opaque strips 26.

It is preferred to use a material which can be laid down by photographic-like techniques wherein a sensitized layer of material is exposed e.g. by actinic radiation or by electron bombardment. For this reason deposits of powdered absorbing materials are usually to be preferred over deposits of evaporated reflective material. Deposition of the latter material may require a screen size masking stencil.

Preferably the opaque strips 26 are provided from a material of relatively low density, i.e. of a relatively low atomic weight. Thus, little beam energy is absorbed by the strips. Preferably, the material of the opaque strips 26 is of lower molecular weight (less dense) than that of the solid continuous phosphor layer 24. In this respect carbon constitutes a preferred material from which to provide the opaque strips 26. Other suitable absorbing materials include, powdered black aluminum, boron compounds, and hydrocarbons which are stable during conventional processing and operation of the cathode ray tube 10.

The opaque strips 26 may consist of a higher density material than that of the continuous phosphor layer 24. Even when this is so, a reduction in shadowing may be secured as compared to prior art screen structures which use strips of phosphor to generate indexing signals. This is so because the weight/unit area of the opaque strips 26 required to provide opacity to the radiation from layer 24, such as the UV luminescence, can still be less than the weight/unit area of a phosphor strip required to produce an indexing signal of useable strength.

As an example of the screen 14, the mosaic 20 may comprise red, blue, green, and yellow-emitting phosphor strips which are respectively 20, 15, 17, and 8 mils wide and which have a weight per unit area respectively of 2.6–2.9, 1.3–1.5, 2.0–2.2, and 1.3–1.5 mg./cm.$^2$. The reflective layer 22 may comprise evaporated aluminum which is approximately 4000 A. thick. The phosphor layer 24 may comprise UV emitting lanthanum phosphate phosphor which is 0.25 mg./cm.$^2$. One indexing strip 26 may be provided for every three color phosphor groups 21. The indexing strips 26 may comprise uniformly spaced colloidal graphite strips which are 90 mils wide and each of which overlies an R, B, G, Y, R, and two-thirds or another B phosphor strip. The indexing strips 26 may be less than 0.1 mg./cm.$^2$ and so thin that no visibly noticeable or measurable absorption of beam energy occurs. As a result, since the beam energy absorbed by the phosphor layer 24 is uniform over the screen, the beam energy remaining for absorption in the mosaic 20 to produce the image output is uniform for any given beam intensity.

Application of the respective elements of the luminescent screen 14 i.e. the color mosaic strips 20, the light reflective layer 22, the solid phosphor layer 24, and the opaque strips 26 may be provided by known techniques. Specifically, for example, the opaque carbon strips 26 may be laid down by first depositing a photosensitized slurry containing carbon particles onto the solid phosphor layer 24 and then insolubilizing strip portions of the slurry layer by exposing the portions to either actinic radiation or electron bombardment. The unexposed portions are removed by a solvent. Alternatively, it has been found that opaque carbon strips 26 can be satisfactorily deposited by first evaporating a suitable carbon containing material such as an ester of salicylic acid onto the solid phosphor layer 24, and then electron bombarding it to effect a chemical change therein to produce a stable hydrocarbon.

Although low density material is preferred for the opaque strips 26, the strips 26 may be provided from any suitable opaque material which can be satisfactorily applied and which will remain stable during tube processing and operation.

In operation of the cathode ray tube 10, an electron beam is projected from the electron gun 16 and scanned by means (not shown) over the luminescent screen 14 so that the scanning lines are perpendicular to the direction of the R, B, G, and Y color phosphor strips and the opaque strips 26. As a result of the electron beam scanning across the luminescent screen 14, the solid phosphor layer 24 is excited to luminescence at all times. However, only that portion of the solid phosphor layer 24 which is not covered by the opaque strips 26 produces a useful luminescence within the envelope 12. When the electron beam impinges upon one of the opaque strips 26, the luminescence from the solid phosphor layer 24 is absorbed or reflected, depending upon the composition of the opaque strip 26, and thereby blocked from radiating into the envelope 12. Thus, as the beam is scanned across the opaque strips 26, intermittent luminescent radiations from the solid phosphor layer 24 will be produced and transmitted through the window 18. A suitable device 28, such as a phototube which is sensitive to the radiations of the phosphor layer 24, may be disposed opposite the window 18 so as to pick up the indexing signals from the luminescent emission of the phosphor layer 24. The signals picked up by the device 28 may be utilized according to known techniques to synchronize the color modulation and scan of the electron beam from the gun 16.

What is claimed is:
1. An image reproducing device including a luminescent screen comprising:
    (a) an array of different color-emitting phosphor deposits disposed in a layer,
    (b) a light reflective layer superimposed on the back of said phosphor deposits,
    (c) a layer of material disposed on the back of said light reflective layer, said material being radiation emissive when bombarded by electrons, and
    (d) an array of mutually spaced deposits which are substantially opaque to said radiations and which are disposed in a predetermined pattern on the back of said layer of material so as to intercept radiations from spaced portions of said layer of material.

2. In a cathode ray tube of the type in which an electron beam is adapted to scan a luminescent screen comprising an array of color phosphor strips and means for generating luminescent indexing signals, the improvement wherein said means comprises a solid continuous phosphor layer overlying said array of color phosphor strips and an array of spaced apart strips of a material opaque to luminescence of said solid continuous phosphor layer disposed in a predetermined pattern on the back of said solid continuous phosphor layer.

3. In a cathode ray tube of the type in which an electron beam is adapted to scan a luminescent screen comprising an array of color phosphor strips, a light reflective layer superimposed on the back of said array of color phosphor strips and means for generating luminescent indexing signals, the improvement wherein said means comprises a solid continuous phosphor layer superimposed on the back of said light reflective layer, and an array of spaced-apart strips on the back of said layer and of a material absorbent to luminescence of the type emitted by said layer.

4. A cathode ray tube comprising means for generating an electron beam and a luminescent screen disposed in the path of said beam, said screen including an array of color phosphor strips, a UV-emitting phosphor layer overlying said array of color phosphor strips, and an array of spaced apart UV-absorbing strips disposed on the back of said UV phosphor layer.

5. A cathode ray tube comprising means for generating an electron beam and a luminescent screen disposed in the path of said beam and including an array of color phosphor strips, a layer of phosphor overlying said array of color phosphor strips, and an array of spaced-apart strips of a material which is opaque to the luminescense of said phosphor layer and which has a lower molecular weight than that of said phosphor layer, said spaced-apart strips being disposed in contact with said phosphor layer.

6. In a cathode ray tube of the type in which an electron beam is adapted to scan a luminescent screen which includes a plurality of recurring color phosphor groups, each of which comprises a plurality of different color-emitting phosphor strips disposed perpendicular to the direction of beam scan, and a light reflecting layer superimposed on the back of said color phosphor groups, the combination therewith of means for generating luminescent indexing signals, said means comprising a phosphor layer superimposed on the back of said light-reflecting layer, and an array of spaced-apart strips of a material which is opaque to the luminescence of said phosphor layer disposed on the back of said phosphor layer, there being fewer of said spaced-apart opaque strips than said recurring color phosphor groups.

7. A cathode ray tube comprising:
(a) an envelope,
(b) a luminescent screen on an internal surface of said envelope,
(c) means within said envelope for projecting an electron beam onto said screen, and
(d) a window in said envelope through which luminescent signals emitting from said screen to within said envelope may radiate the exterior of said envelope,
(e) said luminescent screen comprising:
   (1) a mosaic of different color-emitting phosphor strips disposed parallel to each other,
   (2) a light-reflective layer disposed on the back of said mosaic,
   (3) a phosphor layer disposed on the back of said light-reflective layer, and
   (4) an array of mutually spaced strips which are substantially opaque to the luminescent emission of said phosphor layer, said opaque strips being disposed on the back of said phosphor layer in systematic relationship with and parallel to said color phosphor strips of said mosaic.

8. A cathode ray tube comprising:
(a) an envelope including a faceplate,
(b) means for generating an electron beam and projecting it onto said faceplate,
(c) an array of color phosphor strips on the internal surface of said faceplate in the path of said beam,
(d) a layer of light-reflective aluminum on said color strips,
(e) a layer of material which emits radiation when excited by electrons, said layer of material being disposed on said aluminum layer,
(f) a window in said envelope rearwardly of said screen to pass said radiations to a signal pickup station externally of said envelope,
(g) an array of systematically spaced-apart strip deposits in contact with said layer of material to intercept and absorb some of said radiations which would otherwise be received by said signal pickup station, whereby a varying signal of said radiations is received at said station when said screen is scanned by said beam.

9. A cathode ray tube comprising:
(a) an envelope,
(b) a luminescent screen on an internal surface of said envelope,
(c) means within said envelope for projecting an electron beam onto said screen, and
(d) a window in said envelope whereby luminescent signals emitted from said screen to within said envelope may be observed from externally of said envelope,
(e) said luminescent screen comprising:
   (1) a mosaic of different color-emitting phosphor strips disposed parallel to each other,
   (2) a light reflective layer of aluminum disposed on the back of said mosaic,
   (3) a UV emitting phosphor layer disposed on the back of said aluminum layer, and
   (4) an array of mutually spaced strips of carbon disposed on the back of said UV phosphor layer in systematic relationship with and parallel to said color phosphor strips.

10. A cathode ray tube comprising:
(a) an envelope,
(b) a luminescent screen on an internal surface of said envelope,
(c) means within said envelope for projecting an electron beam onto said screen, and
(d) a window in said envelope rearwardly of said screen for passing luminescent radiations within said envelope to pickup station externally of said envelope,
(e) said luminescent screen comprising:
   (1) a mosaic of recurring color phosphor groups, each of which comprises a plurality of different color-emitting phosphor strips disposed parallel to each other.
   (2) a light-reflective layer of evaporated metal disposed on the back of said mosaic,
   (3) a layer of UV-emitting phosphor disposed on the back of said light reflective layer, and
   (4) an array of mutually spaced strips of carbon-containing material disposed on the back of said UV phosphor layer parallel to said color phosphor strips, said carbon-containing strips having a lower weight/unit area than that of said UV phosphor layer, the number of said spaced strips being less than the number of said recurring color phosphor groups.

11. A cathode ray tube comprising a luminescent screen and means for projecting an electron beam onto said screen, said luminescent screen comprising:
(a) an array of different color-emitting phosphor strips disposed parallel to each other,
(b) a light reflective layer disposed on the back of said array,
(c) a solid continuous phosphor layer disposed on the back of said light reflective layer, and
(d) an array of mutually spaced strips which are substantially opaque to the luminescent emission of said solid phosphor layer disposed contiguous with said solid phosphor layer so as to intercept luminescent emission from spaced portions of said solid layer which would otherwise be radiated rearwardly from said screen.

References Cited by the Examiner

UNITED STATES PATENTS 3,164,744  1/1965  Bowker _____ 313—92 X

JAMES W. LAWRENCE, *Primary Examiner.*

R. SEGAL, *Assistant Examiner.*